(12) United States Patent
Bayless

(10) Patent No.: US 9,908,777 B2
(45) Date of Patent: Mar. 6, 2018

(54) METHOD AND SYSTEM FOR ENHANCING THE MASS TRANSFER RATE OF A SOLUBLE GAS

(71) Applicant: Ohio University, Athens, OH (US)

(72) Inventor: David James Bayless, Athens, OH (US)

(73) Assignee: Ohio University, Athens, OH (US)

( * ) Notice: Subject to any disclaimer, the term of this patent is extended or adjusted under 35 U.S.C. 154(b) by 21 days.

(21) Appl. No.: 14/782,343

(22) PCT Filed: Apr. 15, 2014

(86) PCT No.: PCT/US2014/034158
§ 371 (c)(1),
(2) Date: Oct. 5, 2015

(87) PCT Pub. No.: WO2014/172348
PCT Pub. Date: Oct. 23, 2014

(65) Prior Publication Data
US 2016/0068394 A1    Mar. 10, 2016

Related U.S. Application Data

(60) Provisional application No. 61/811,904, filed on Apr. 15, 2013.

(51) Int. Cl.
| | |
|---|---|
| *C01B 31/00* | (2006.01) |
| *B01J 23/755* | (2006.01) |
| *B01J 23/06* | (2006.01) |
| *B01J 35/06* | (2006.01) |
| *B01J 19/24* | (2006.01) |

(Continued)

(52) U.S. Cl.
CPC .......... *C01B 31/00* (2013.01); *B01D 53/1475* (2013.01); *B01D 53/18* (2013.01); *B01J 19/2475* (2013.01); *B01J 23/06* (2013.01); *B01J 23/755* (2013.01); *B01J 35/065* (2013.01); *B01D 53/62* (2013.01); *B01D 2251/304* (2013.01); *B01D 2251/604* (2013.01); *B01D 2252/103* (2013.01); *B01D 2255/20753* (2013.01); *B01D 2255/20792* (2013.01); *B01J 2219/24* (2013.01); *Y02C 10/06* (2013.01); *Y02P 20/152* (2015.11)

(58) Field of Classification Search
CPC .... B01D 53/1475; B01D 53/18; B01D 53/62; B01D 2251/304; B01D 2251/604; B01D 2252/103; B01D 2255/20753; B01D 2255/20792; B01J 23/755; B01J 35/065; B01J 19/2475; B01J 23/06; C01B 31/00; Y02P 20/152; Y02C 10/06
See application file for complete search history.

(56) References Cited

U.S. PATENT DOCUMENTS

| | | | | |
|---|---|---|---|---|
| 2006/0127656 A1* | 6/2006 | Gallo | ................... | B01D 53/228 428/212 |
| 2012/0220025 A1* | 8/2012 | Gellett | ............... | B01D 53/1475 435/289.1 |

* cited by examiner

*Primary Examiner* — Daniel C McCracken
(74) *Attorney, Agent, or Firm* — Wood Herron & Evans LLP

(57) ABSTRACT

A method for enhancing the mass transfer rate of a soluble gas from a gaseous phase to an aqueous phase using a membrane including a catalyst. The method comprises wetting the membrane with a liquid such that a film of the liquid forms on at least a portion of the membrane, the film contacting at least a portion of the catalyst. The method further comprises exposing the wetted membrane to at least one soluble gas, wherein at least a portion of the soluble gas dissolves into the liquid.

17 Claims, 4 Drawing Sheets

(51) Int. Cl.
*B01D 53/14* (2006.01)
*B01D 53/18* (2006.01)
B01D 53/62 (2006.01)

US 9,908,777 B2

METHOD AND SYSTEM FOR ENHANCING THE MASS TRANSFER RATE OF A SOLUBLE GAS

This application is a submission under 35 USC § 371 of International Application No. PCT/US2014/034158, filed Apr. 15, 2014, which claims priority to U.S. Provisional Patent Application Ser. No. 61/811,904, filed on Apr. 15, 2013, the disclosures of which are expressly incorporated by reference herein in their entirety.

FIELD OF THE INVENTION

This invention generally relates to the field of gas to liquid mass transfer of soluble gas.

BACKGROUND

Gas-to-liquid mass transfer has numerous industrial applications. Soluble gases, such as carbon dioxide and ammonia, can be captured and absorbed into a solvent such as water. One particular application where gas-to-liquid mass transfer has potential for significant growth is in the use of natural sinks for sequestering carbon dioxide or other gases from air. Other applications of gas to liquid mass transfer include the production of microalgae as a feedstock for the mitigation of carbon dioxide emission, and the production of biofuels. Such applications require a consistent and controlled supply of inorganic carbon to the microalgae (or cyanobacteria) culture. The carbon dioxide must be introduced into the growth medium (i.e., water) of the microalgae in a way that does not abruptly and significantly reduce the pH of the growth medium, which may happen as carbonic acid forms when carbon dioxide is absorbed by, and reacts with water.

There are two rate-limiting steps in the transfer of carbon dioxide to water—the gas exchange to the boundary layer in the water and the conversion of the dissolved carbon dioxide into carbonic acid in the water. Carbon dioxide from the air, or any gas containing carbon dioxide, must first transfer into the water (or any liquid which acts as a solvent for carbon dioxide) across a resistive "layer" often called the boundary layer. For ponds or raceways, the boundary layer has an average thickness of several millimeters. Because the rate of diffusion of carbon dioxide into the water is roughly proportional to the thickness of the boundary layer, a thinner boundary layer means that carbon dioxide is transferred into the solution faster. Once in solution, the amount of aqueous phase carbon dioxide begins to build up. The aqueous phase carbon dioxide reacts with the water to form carbonic acid ($H_2CO_3$). Because this conversion rate is relatively slow, this conversion is a significant rate limiting step in the process of building up a supply of inorganic carbon (IOC) within a supply of water or liquid, such as in a raceway or pond. There is therefore a need to address these and other issues in the art.

SUMMARY

In that regard, a method for enhancing the mass transfer rate of a soluble gas from a gaseous phase to an aqueous phase using a membrane including a catalyst is provided. The method comprises wetting the membrane with a liquid such that a film of the liquid forms on at least a portion of the membrane, the film contacting at least a portion of the catalyst. The method further comprises exposing the wetted membrane to at least one soluble gas, wherein at least a portion of the soluble gas dissolves into the liquid.

A system for enhancing the mass transfer rate of a soluble gas from a gaseous phase to an aqueous phase is also provided. The system comprises a membrane configured to allow the formation of a film of aqueous solution thereon. The membrane includes an amount of a catalyst configured to increase the rate of mass transfer of at least one soluble gas from a gaseous phase to an aqueous phase in an aqueous solution when the at least one soluble gas and the catalyst are exposed to the film of aqueous solution. The system further comprises a liquid supplying apparatus configured to wet the membrane for forming the film on the membrane.

A membrane for enhancing the mass transfer rate of a soluble gas from a gaseous phase to an aqueous phase is also provided. The membrane comprises a porous structure including a first membrane material and a catalyst disposed thereon. The catalyst is configured to increase the rate of mass transfer of at least one soluble gas from a gaseous phase to an aqueous phase in an aqueous solution when the at least one soluble gas and the catalyst are exposed to the film of aqueous solution. In one embodiment, the catalyst is a zinc-based material or a nickel-based material.

BRIEF DESCRIPTION

DETAILED DESCRIPTION

Figure 1:
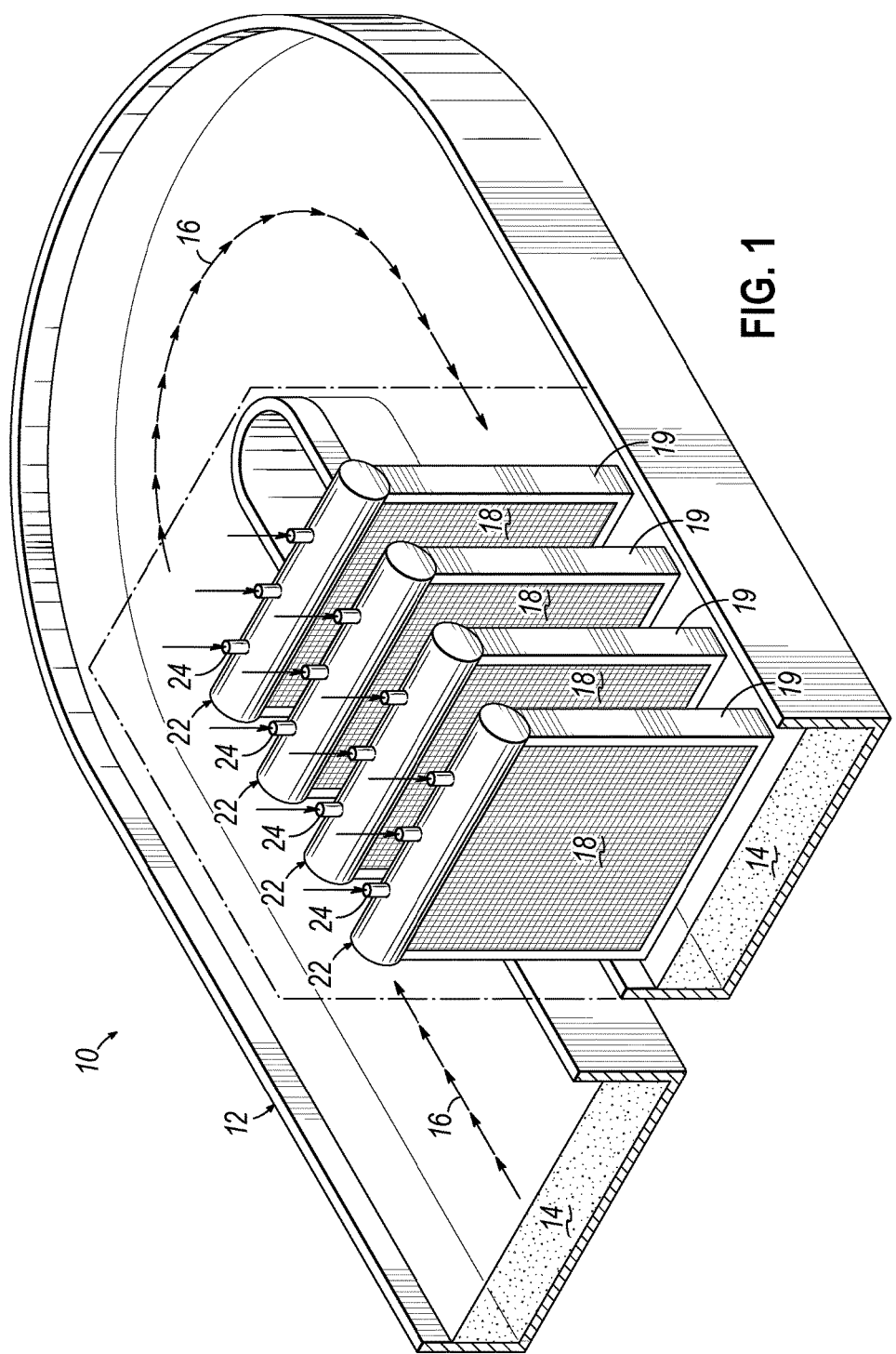
FIG. 1 is a perspective view of one embodiment of a system for enhancing the mass transfer rate of a soluble gas, including a plurality of membranes suspended above a raceway.

Referring to FIG. 1, a system 10 for enhancing the mass transfer rate of a soluble gas is shown. The system 10 includes a raceway 12 containing a supply of aqueous solution or liquid 14. In the embodiment shown, the liquid 14 is water. However, in other embodiments, the liquid 14 may be different depending on the particular gas that is desired to be dissolved into the liquid 14, as described in more detail below. Moreover, in other systems, the supply of liquid 14 may be much larger, and may be man-made or natural. For example, the supply of liquid 14 may be a body of water such as a pond or lake. As indicated by arrows 16, the liquid 14 may flow through the raceway 12, though moving the liquid 14 in the raceway 12 is optional.

Figure 3:
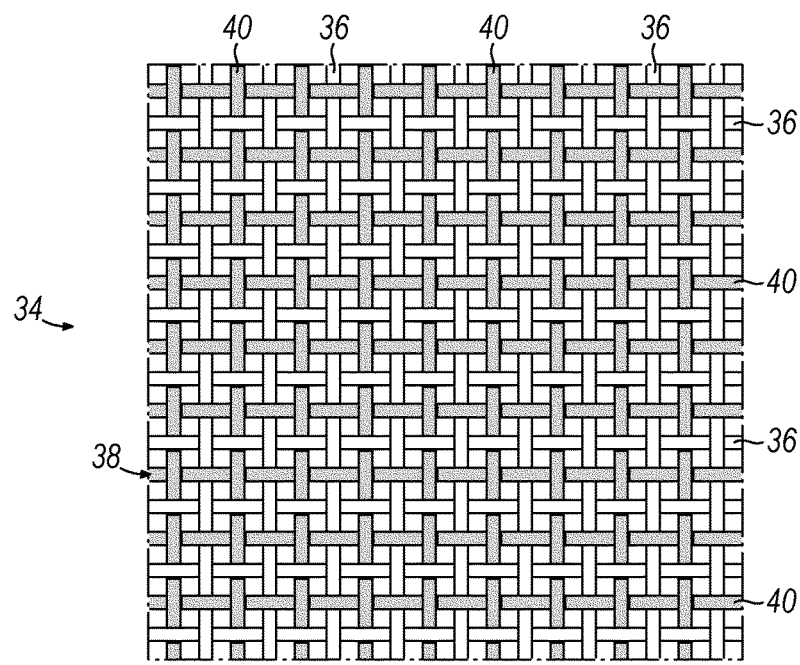
FIG. 3 is one embodiment of a membrane.
Figure 4:
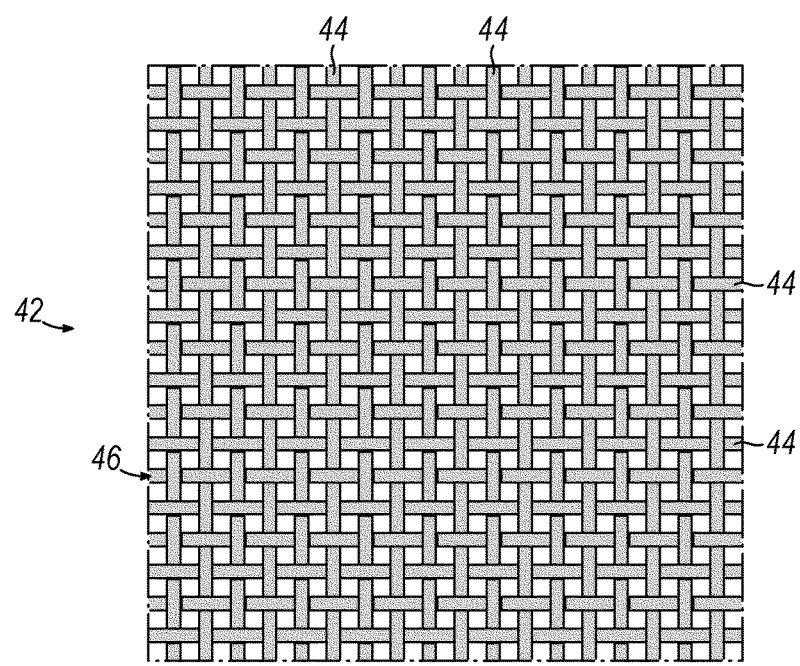
FIG. 4 is an alternative embodiment of a membrane.

The system 10 also includes a set of membranes 18. As shown, there are four membranes 18. However, in other embodiments, there may be a different number of membranes 18, such as one, two, or three, or more than four. Each of the membranes 18 is suspended relative to the liquid 14 via a support structure 19. Each membrane 18 may be a woven structure of one or more materials (FIGS. 3 and 4). Alternatively, each membrane 18 may be a non-woven structure (i.e., felt) of one or more materials.

Membrane 18 can be formed from polymeric fibers such as polypropylene and nylon, and others. While the fibers may be made from a material that is hydrophobic, the configuration of the membrane 18 may allow for the formation of the film 20 such that the membrane 18 itself is generally hydrophilic. In that regard, the membrane 18 may be porous, such that the liquid may be captured by the pores.

The system 10 further includes a liquid supply system or apparatus 22 in fluid communication with each membrane 18. The liquid supply system 22 includes a plurality of inlets 24. Liquid, such as water, may flow via a pump (not shown) into the inlets 24 and flow onto the membrane 18, thereby forming a falling film 20 of liquid 21 on the membrane 18. The film 20 of liquid 21 is exposed to a soluble gas 26, such as carbon dioxide or ammonia. The film 20 is configured to interact with and allow dissolution of the soluble gas 26 into the film 20. Eventually, the film 20 falls and/or flows along the membrane 18 and drips into the liquid 14 in the raceway 12 below, thus delivering at least some of the dissolved carbon dioxide (which may be in the form of carbonic acid, as discussed below), to the liquid 14 in the raceway 12. Thus, any soluble gas 26 that has dissolved into the film 20 and transferred to the aqueous phase will be directed into the supply of liquid 14 in the raceway 12. One exemplary system for delivering a liquid to a suspended membrane is disclosed in International Application PCT/US2008/064067, entitled FLOW-CONTROLLING HEADER (Ohio University, Athens, Ohio, USA). Another exemplary system for delivering a liquid to a suspended membrane is disclosed in International Application PCT/US2011/053254, entitled HYBRID SYSTEM FOR ENHANCING ALGAL GROWTH USING VERTICAL MEMBRANES (Ohio University). The '067 and '254 applications are incorporated herein by reference, in their entireties. In another embodiment, the membrane 18 or membranes 18 may be configured to move relative to, or to move in and out of, the supply of liquid 14 in order to deliver the aqueous phase carbon dioxide into a supply of liquid 14 for the collection of inorganic carbon, such as in the system disclosed in U.S. Provisional Application No. 61/972,589 (Ohio University), entitled METHOD AND SYSTEM FOR ENHANCING THE MASS TRANSFER RATE OF A SOLUBLE GAS. The '589 application is incorporated by reference, in its entirety.

Figure 2:
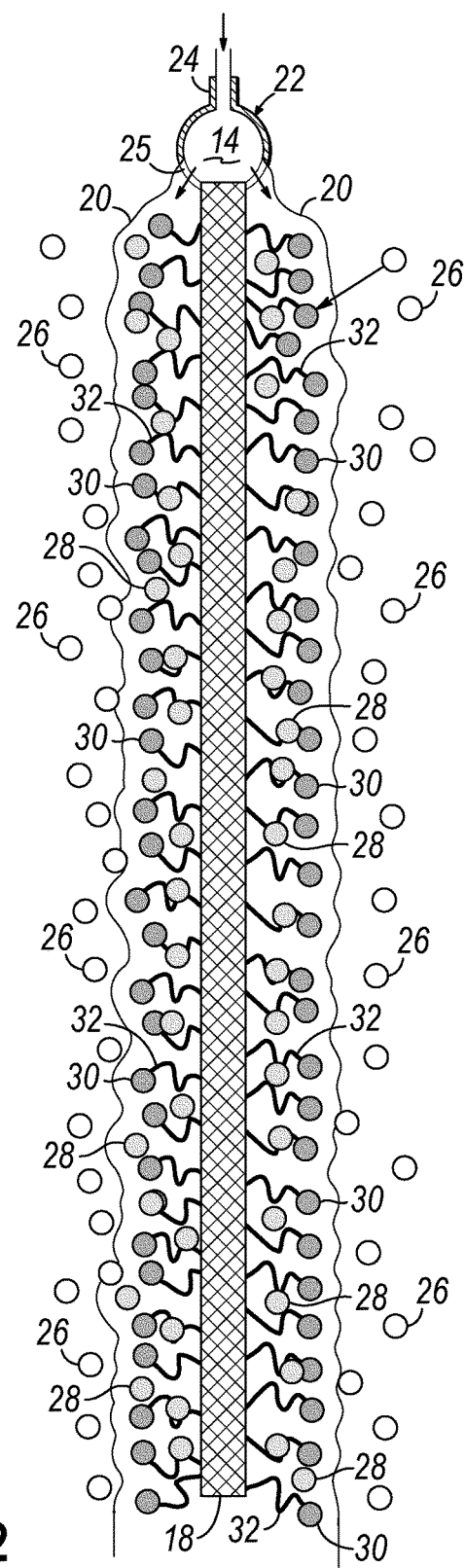
FIG. 2 is a diagrammatic view of a reaction between a soluble gas and a liquid film formed on one of the membranes shown in FIG. 1.

Referring to FIG. 2, liquid 21 is directed out of the liquid supply system outlet 25 so as to flow the liquid 21 over the membrane 18. Accordingly, due to characteristics of the membrane 18 described herein, a film 20 of liquid 21 forms on the membrane 18. Preferably, the membrane 18 is sized such that the film 20 that forms on the membrane 18 allows for the dissolution of a soluble gas 26 thereinto. A soluble gas 26, such as carbon dioxide from the air, or any gas containing carbon dioxide, must first transfer into the film 20 of liquid 21 (or any liquid which acts as a solvent for carbon dioxide) across a resistive "layer" often called the boundary layer. Because the diffusion of soluble gas 26 into the film 20 is roughly proportional to the thickness of the boundary layer, a thinner boundary layer means that carbon dioxide is transferred into solution faster. The film 20 provides a thinner boundary layer through which the soluble gas 26 may transfer. Once transferred into the film 20, the aqueous phase carbon dioxide reacts with the liquid 21 to form carbonic acid ($H_2CO_3$) 28. Once formed the carbonic acid 28 reacts almost instantaneously with any hydroxide ions to produce bicarbonate, re-equilibrating the carbonate-bicarbonate buffer and the formation of carbonic acid 28 (drawing more aqueous phase carbon dioxide into carbonic acid and thus to bicarbonate and carbonate). At pH 8 most of the carbonic acid is converted to bicarbonate, and thus continuously and essentially instantaneously removed from solution. Thus, the amount of carbonic acid 28 present in the film 20 is a measure of total inorganic carbon in the film 20. The carbonic acid 28, and thus inorganic carbon, is transferred to the liquid 14 in the raceway 12 as the film 20 flows or falls along the membrane 18 and drips into the raceway 12.

Figure 5:
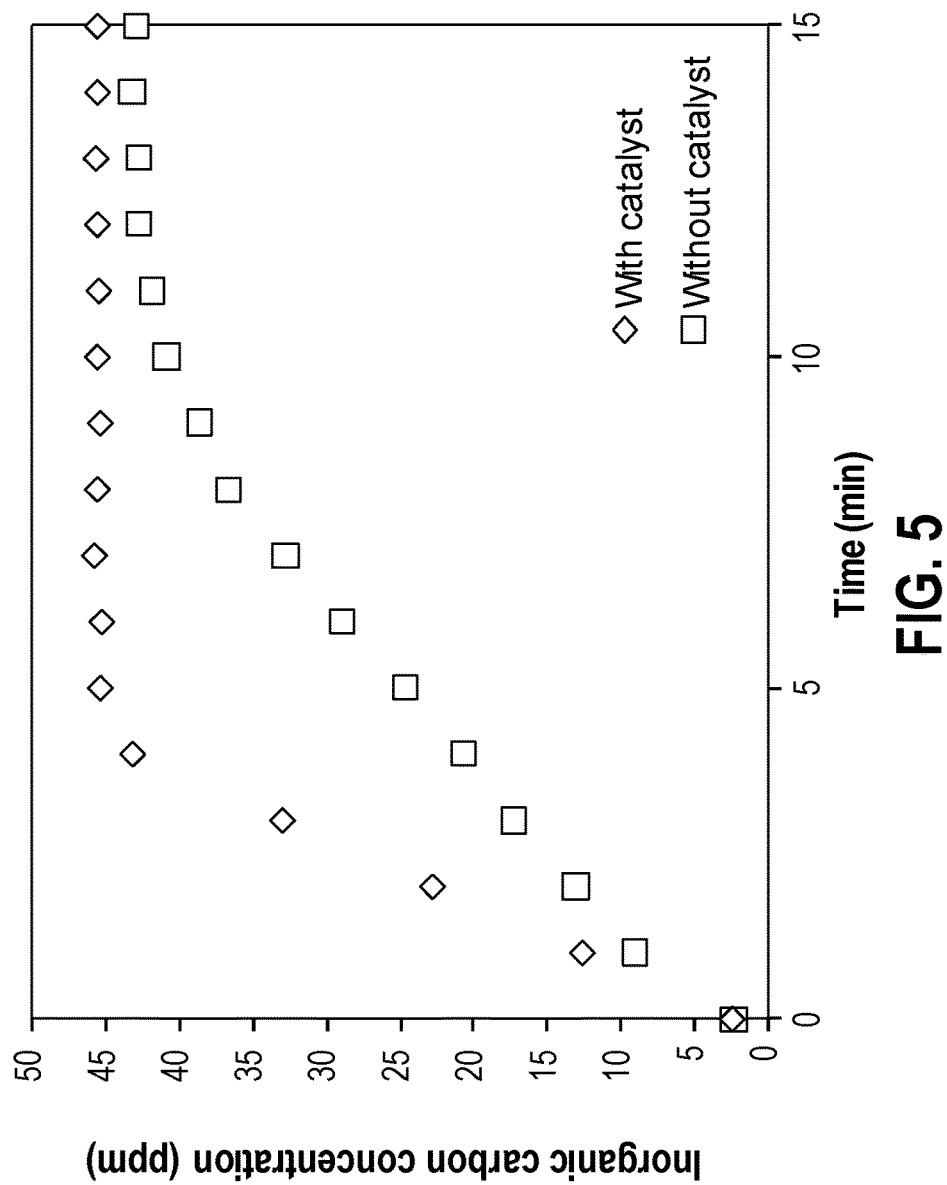
FIG. 5 is a graph showing results of an experiment using one embodiment of a system for enhancing the mass transfer rate of a soluble gas.

The rate of reaction between aqueous phase carbon dioxide and liquid 21 to form carbonic acid 28 is very slow and is the most significantly rate limiting step in the transfer of inorganic carbon to solution. Therefore, still referring to FIG. 2, the membrane 18 includes a catalyst 30 bonded thereto in order to increase the rate of reaction between aqueous phase carbon dioxide and water. When the film 20 of liquid 21 is in contact with both the catalyst 30 and the aqueous phase carbon dioxide, the rate of reaction between liquid 21 and carbon dioxide to carbonic acid 28 increases substantially. The effect of the catalyst 30 on the rate of reaction in an exemplary experiment is shown in FIG. 5. In this experiment, water at room temperature (22° C.) with an added 3 mM NaOH solution was passed over membranes at a rate of 2 gallons per minute per linear foot of membrane in contact with a header (i.e., same or similar to liquid supply system 22). The gas that was in contact with the membrane was air enriched with 2% (by volume) $CO_2$. Time resolved measurements of TIC concentrations were taken from the collected water with and without a catalyst added to the membrane system. As shown, the TIC concentration in a supply of water (using a similar system with a catalyst as described herein) increased substantially more quickly than a system not utilizing a catalyst, reaching equilibrium in approximately 30% of the time taken without catalytic action.

In one embodiment, the catalyst 30 is a material that is configured to catalyze the reaction (i.e., increase the rate of reaction) between aqueous phase carbon dioxide and water to form carbonic acid. In one embodiment, the catalyst 30 is a metal. In one embodiment, the metal is zinc-based or nickel-based. In a further embodiment, the metal may be a zinc oxide or a nickel oxide. For example, the catalyst 30 may be a galvanized or other wire that is woven within the membrane 18. Alternatively, the catalyst 30 may be deposited onto the membrane material by a process such as vapor deposition. Moreover, the catalyst 30 may be a zinc-based mixture (i.e., zinc and copper) deposited onto a suitable substrate such as alumina.

As shown in FIG. 2, the catalyst 30 is bonded to the membrane 18 with a covalent bond 32. Preferably, the catalyst 30 is bonded to the membrane 18 with a strength sufficient to withstand at least shear forces of liquid 21 flowing over the membrane 18. Referring to FIG. 3, one embodiment of a membrane 34 is provided. The membrane 34 is a woven structure having a first membrane material 36 in a woven pattern. The first membrane material 36 may include fabrics, polymers such as polypropylene and nylon, and others described herein. The membrane 34 includes a catalyst 38 woven in with or into the membrane 34. As shown, there is at least one, and preferably a plurality of, filaments, strands, or fibers 40 of catalyst 38 woven into the membrane 34 in order to increase the rate of reaction between aqueous carbon dioxide and water to form carbonic acid, similar to the previous embodiment. Alternatively, referring to the alternative embodiment shown in FIG. 4, the entire membrane 42 may be made from filaments, strands, or fibers 44 of the catalyst 46.

Over time, the catalyst 30, 38, 46 may degrade from the membrane 18, 34, 42. Therefore, over time, the entire membrane 18, 34, 42, or the catalyst 30, 38, 46 of the membrane 18, 34, 42 may be replaced. In that regard, the degraded catalyst 30, 38, 46 may be removed and a new supply of catalyst 30, 38, 46 may be attached (i.e., bonded, or weaved into) the membrane 18, 34, 42.

Thus, the system 10 as described herein provides a manner in which the mass transfer rate of a soluble gas, such as carbon dioxide or ammonia, is enhanced. The system 10 is applicable to a wide variety of applications, such for the sequestration of carbon dioxide, ammonia, and other soluble gases that are emitted in variety of processes. Other applications include the production of microalgae as a feedstock for the mitigation of carbon dioxide emission, and the production of biofuels. The system 10 provides these benefits and advantages in a more efficient and potentially lower cost manner than existing systems.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A method for enhancing the mass transfer rate of a soluble gas from a gaseous phase to an aqueous phase using a membrane including a catalyst, the method comprising:
   wetting the membrane with a liquid such that a film of the liquid forms on at least a portion of the membrane, the film being defined at least in part by a boundary layer opposite the membrane and contacting at least a portion of the catalyst; and
   exposing the wetted membrane to at least one soluble gas, wherein at least a portion of the soluble gas dissolves into the liquid through the boundary layer.

2. The method of claim 1, wherein exposing the wetted membrane to at least one soluble gas further comprises:
   exposing the wetted membrane to carbon dioxide, ammonia, or other soluble gases.

3. The method of claim 1, wherein wetting the membrane further comprises:
   flowing the liquid over the membrane.

4. The method of claim 1, wherein wetting the membrane further comprises:
   moving at least a portion of the membrane into a supply of liquid.

5. The method of claim 4, wherein exposing the wetted membrane to at least one soluble gas further comprises:
   moving at least a portion of the membrane out of the supply of liquid.

6. The method of claim 1, further comprising:
   removing the catalyst from the membrane after the catalyst has degraded; and
   attaching an additional amount of the catalyst to the membrane.

7. A system for enhancing the mass transfer rate of a soluble gas from a gaseous phase to an aqueous phase, comprising:
   a membrane configured to allow the formation of a film of aqueous solution thereon, the membrane including a first surface and a second surface opposite the first surface and including an amount of a catalyst configured to increase the rate of mass transfer of at least one soluble gas from a gaseous phase to an aqueous phase in an aqueous solution when the at least one soluble gas and the catalyst are exposed to the film of aqueous solution; and
   a liquid supplying apparatus configured to wet the first and second surfaces of the membrane for forming the film on the membrane.

8. The system of claim 7, wherein at least a portion of the membrane is formed from filaments, strands, or fibers of the catalyst.

9. The system of claim 7, wherein the catalyst further comprises a metal.

10. The system of claim 7, wherein the catalyst further comprises a zinc-based material or nickel-based material.

11. The system of claim 9, wherein the catalyst further comprises a zinc-oxide material.

12. The system of claim 7, further comprising:
    a supply of the liquid configured to capture liquid from the membrane.

13. The system of claim 7, wherein the membrane further comprises a plurality of fibers of at least one material and the catalyst is in the form of at least one filament woven with at least some of the fibers.

14. The system of claim 7, wherein the catalyst is bonded to the membrane with a strength sufficient to withstand at least shear forces of water flowing over the membrane.

15. The system of claim 7, wherein the membrane is in contact with water and carbon dioxide.

16. A method for enhancing the mass transfer rate of a soluble gas from a gaseous phase to an aqueous phase using a membrane including a catalyst, the method comprising:
    wetting the membrane with a liquid such that a film of the liquid forms on at least a portion of the membrane, the film contacting at least a portion of the catalyst;
    exposing the wetted membrane to at least one soluble gas, wherein at least a portion of the soluble gas dissolves into the liquid;
    removing the catalyst from the membrane after the catalyst has degraded; and
    attaching an additional amount of the catalyst to the membrane.

17. A system for enhancing the mass transfer rate of a soluble gas from a gaseous phase to an aqueous phase, comprising:
    a membrane configured to allow the formation of a film of aqueous solution thereon, the membrane including an amount of a catalyst configured to increase the rate of mass transfer of at least one soluble gas from a gaseous phase to an aqueous phase in an aqueous solution when the at least one soluble gas and the catalyst are exposed to the film of aqueous solution, wherein at least a portion of the membrane is formed from filaments, strands, or fibers of the catalyst; and
    a liquid supplying apparatus configured to wet the membrane for forming the film on the membrane.

* * * * *